J. W. RENO.
TRUCK CONVEYER.
APPLICATION FILED JULY 5, 1910.

974,918.

Patented Nov. 8, 1910.
3 SHEETS—SHEET 2.

WITNESSES:
Ernest Miller
John F. Valentine

INVENTOR
Jesse W. Reno
BY Chas. J. Earll.
ATTORNEY

J. W. RENO.
TRUCK CONVEYER.
APPLICATION FILED JULY 5, 1910.
974,918.
Patented Nov. 8, 1910.
3 SHEETS—SHEET 3.
Fig. 4,
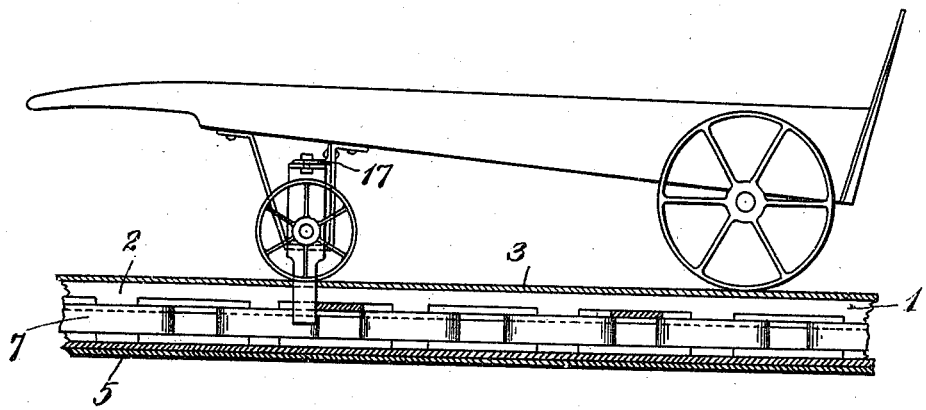
Fig. 5,
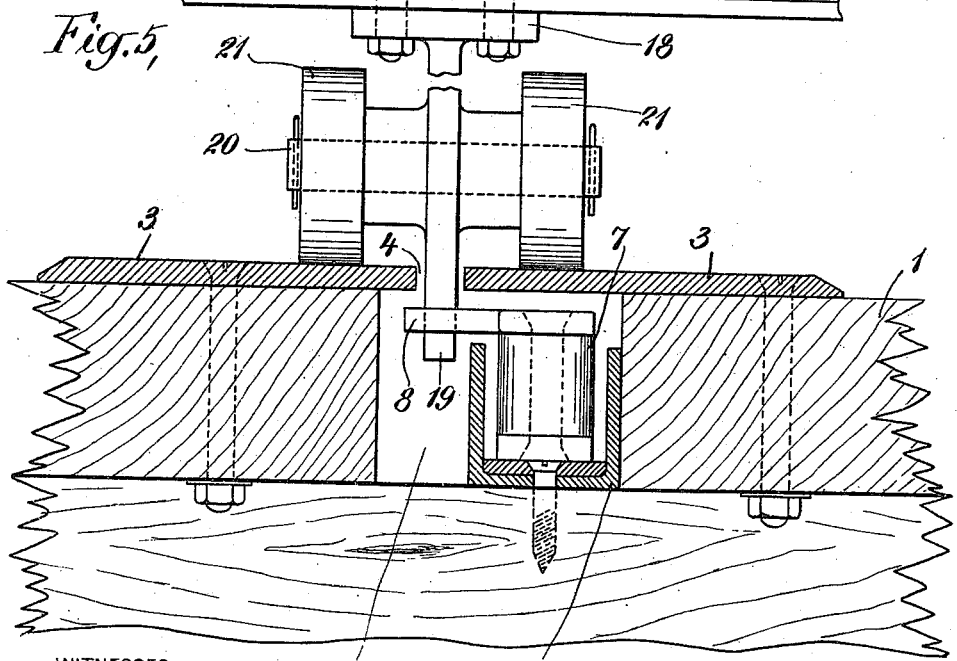
WITNESSES:
Ernest Miller
John F. Valentine
INVENTOR
Jesse W Reno
BY
Chas. F. Carll.
ATTORNEY
THE NORRIS PETERS CO., WASHINGTON, D. C.

UNITED STATES PATENT OFFICE.

JESSE W. RENO, OF NEW YORK, N. Y.

TRUCK-CONVEYER.

974,918.  Specification of Letters Patent.  Patented Nov. 8, 1910.

Application filed July 5, 1910. Serial No. 570,274.

*To all whom it may concern:*

Be it known that I, JESSE W. RENO, a citizen of the United States of America, and resident of the city, county, and State of New York, have invented certain new and useful Improvements in Truck-Conveyers, of which the following is a specification.

My invention relates to truck conveyers.

The object of my invention is to provide a simple, effective and convenient mechanism by means of which trucks may be conveyed along the floors of docks and warehouses and similar places, without obstructing such floors or interfering with their ordinary uses.

My invention consists in providing conduits in the floor in which are placed chain guides adapted to receive a traveling chain; in covering said conduits with plates arranged to leave an open narrow slot above and at one side of the chain guides, in providing lugs on said chain which extend beneath and across said slots; in providing means on the trucks adapted to engage said lugs; in providing horizontal chain-wheels beneath the floor to drive and guide the chain, arranged tangent to two parallel slots and chain guides, so that with a single chain trucks may be conveyed in either direction; and in other novel features and constructions to be hereinafter fully pointed out and described.

Figure 1:
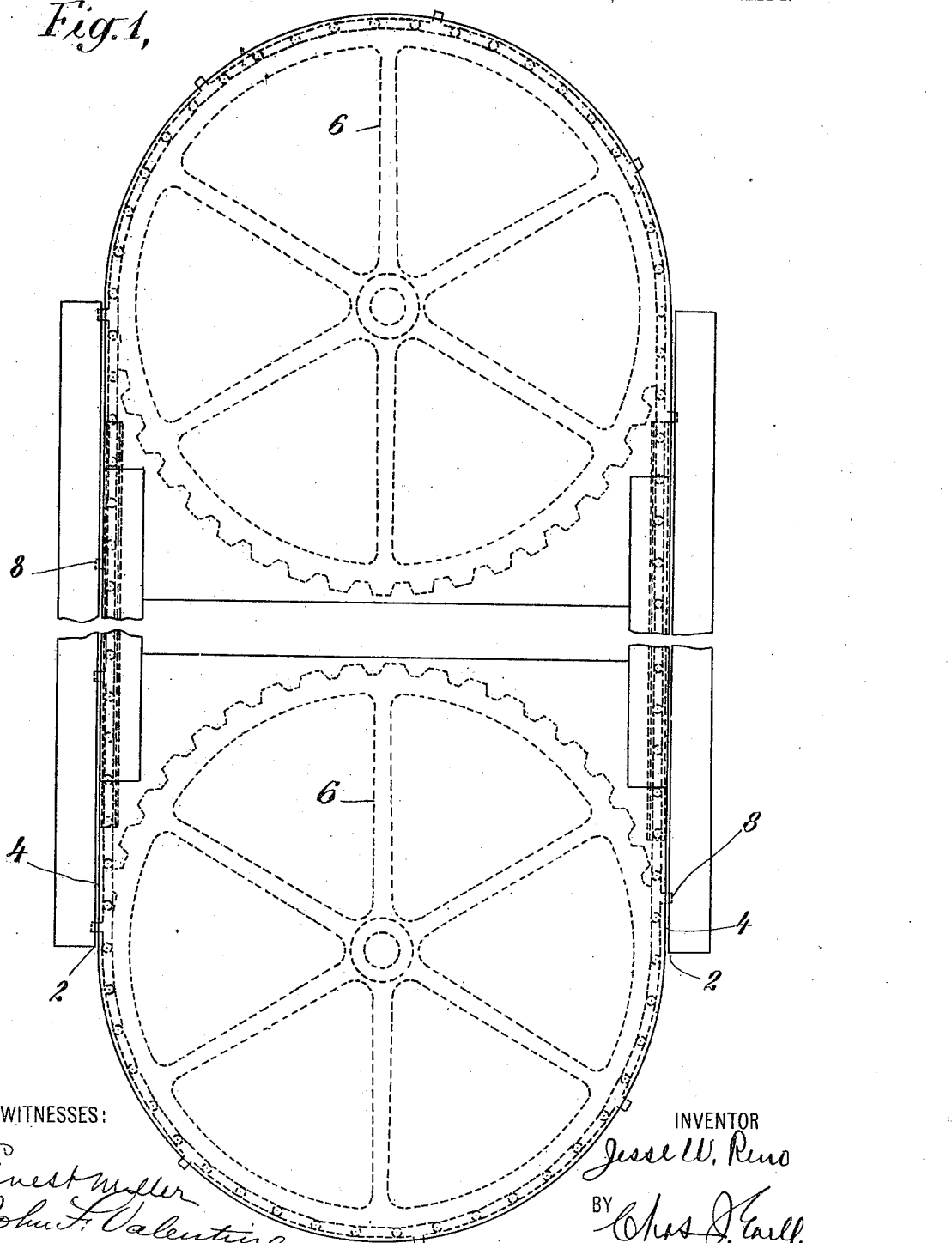
Figure 2:
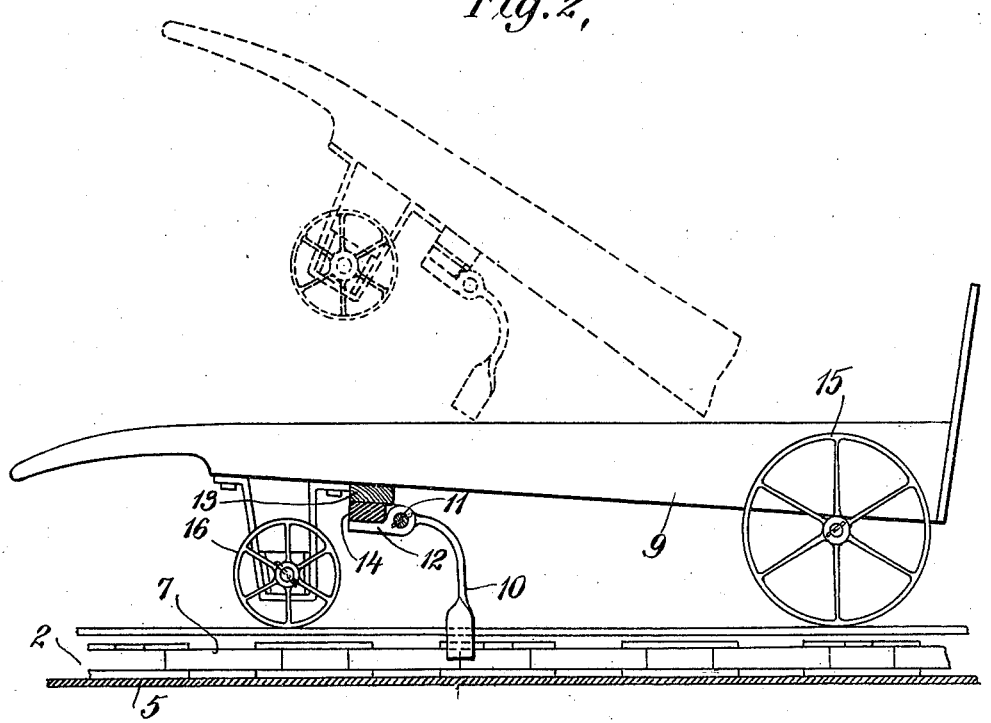
Figure 3:
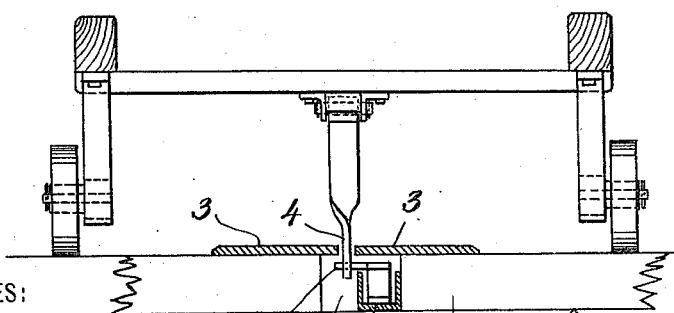

In the drawings accompanying and forming a part of this specification, Figure 1 represents a plan view, Figs. 2 and 3 represent partial longitudinal and transverse sections, Fig. 4 represents a longitudinal section showing a modified form of truck, and Fig. 5 represents a partial transverse section on an enlarged scale.

Numeral 1 represents the floor of a dock or warehouse upon which packages of freight have to be moved or transported from one place to another; and 2 represents conduits formed in the floor. Plates 3 are secured to the floor on either side of the conduits 2 and project over and partially cover the same and they are spaced apart so as to leave a slot 4 between them. A chain guide 5 is secured within the conduit at one side thereof so that dirt or refuse falling through said slot will not fall into the chain guide. Beneath the floor at the ends of the two parallel conduits are arranged two horizontal chain-wheels 6 whose peripheries are tangent to the lines of the chain guides. An endless chain 7 is mounted upon the chain-wheels 6 and traverses through the chain guides. The chain is provided at intervals with lugs 8 which project across beneath the slot 4. The trucks 9 may be of any appropriate construction, provided with engaging means adapted to enter the slot 4 and make engagement with the lugs 8 of the chain. I prefer to make the engaging means on the trucks elastic so as to lessen the shock when engagement is made with the chain lugs. For this purpose I provide a pivotal support 11 secured to the truck, upon which is pivoted a bell-crank the arm 10 of which is preferably made of spring steel. It has an extension 12 between which and the cross-member 13 secured to the truck, is a rubber buffer 14. By means of this construction, both on account of the elasticity of the arm 10 and that of the rubber buffer, the shock of engagement with the chain lugs is prevented. At the same time by means of the pivotal connection the truck engaging means will turn upon the pivot and permit the truck wheels 16 to rest upon the floor when the truck engaging means is not over the slot.

In Figs. 4 and 5 I have shown a modification of the truck engaging means. A transverse angle bar 17 is secured to the truck and at its central portion a bracket 18 is secured, having a lug 19 adapted to extend into the slot and make engagement with the lugs 8 of the chain. The bracket is provided with a shaft 20 on which the truck wheels 21 are pivotally mounted.

It will be observed that by means of my invention the trucks may be used in the ordinary manner. They may be loaded at any convenient place, wheeled manually to the line of the conduit and then brought into position and the truck engaging means lowered into the slot, when engagement will be made with one of the lugs on the chain and the truck will be carried along until an attendant lifts the truck from its engagement, when it will be again taken manually to the point desired.

On many docks and in many warehouses a large part of the expense of handling freight is due to the long distances, sometimes over one thousand feet, which have to be traversed by the trucks. By means of my invention much of this expense may be saved.

An important feature of my invention is that only slight modification of the standard form of truck is required; and another important feature is that the floor space where it is installed is not obstructed and the free passage of wagons, teams, et cetera is not interfered with.

Having thus described my invention, what I claim is:

1. In a truck conveyer the combination with a floor having a channel or groove formed therein, of cover plates secured to said floor above said channel and separated by a space to form a relatively narrow slot above said channel, a chain guide in said channel, a chain adapted to operate in said chain guide, lugs secured to said chain and extending across the plane of said slot.

2. In a truck conveyer the combination with a floor having a channel or groove formed therein, of cover plates secured to said floor above said channel and separated by a space to form a relatively narrow slot above said channel, a chain guide in said channel at one side of said slot, a chain adapted to operate in said chain guide, lugs secured to said chain and extending across the plane of said slot.

3. In a truck conveying apparatus the combination with a floor or deck having a slot formed therein, of a pair of horizontal chain-wheels rotatably mounted beneath said floor or deck, a chain operatively mounted on said chain-wheels, lugs secured to said chain in operative relation to said slot, and a truck having elastic engaging means secured thereto adapted to pass through said slot.

4. A truck provided with front and rear truck wheels and a lever pivoted to said truck adapted in one position to extend below the plane of the base of said truck wheels, and to be raised above said plane, and an elastic banking or stop adapted to engage said lever when it is in its lower position.

5. In a truck conveying apparatus the combination with a floor having a channel formed therein, of a flexible driving member provided with truck engaging means adapted to travel in said channel, a truck provided with front and rear wheels and with engaging means adapted to engage said truck engaging means, located near the forward truck wheels, whereby said truck will follow the line of said channel without the use of guides or tracks for the rear wheels.

In testimony whereof, I have signed my name to this specification in the presence of two subscribing witnesses.

JESSE W. RENO.

Witnesses:
FLORENCE J. WALSH,
ERNEST MILLER.